United States Patent [19]

Baskett

[11] Patent Number: 4,840,392
[45] Date of Patent: Jun. 20, 1989

[54] TRAILER HITCH GUIDE

[76] Inventor: Theodore N. Baskett, 9514 Portland Ave., Tacoma, Wash. 98445

[21] Appl. No.: 179,687

[22] Filed: Apr. 11, 1988

[51] Int. Cl.$^4$ .............................................. B60D 1/06
[52] U.S. Cl. ..................................... 280/477; 280/507
[58] Field of Search .............. 280/477, 507, 506, 505, 280/511; 403/353, 254, 252

[56] References Cited

U.S. PATENT DOCUMENTS

| | | | |
|---|---|---|---|
| 462,648 | 11/1891 | Bolles | 403/353 |
| 3,420,549 | 1/1969 | Robinson | 280/477 |
| 3,747,958 | 7/1973 | Hackett | 280/477 |
| 3,765,703 | 10/1973 | Voelkerding et al. | 280/477 |
| 3,773,356 | 11/1973 | Eichels et al. | 280/477 |
| 3,841,664 | 10/1974 | Anderson | 280/507 |
| 3,866,949 | 2/1975 | Green | 280/507 |
| 3,879,062 | 4/1975 | Miller | 280/477 |
| 3,944,259 | 3/1976 | Miller | 280/477 |
| 4,226,438 | 10/1980 | Collins | 280/477 |
| 4,417,748 | 11/1983 | Dortch | 280/477 |
| 4,560,183 | 12/1985 | Cook | 280/477 |
| 4,657,275 | 4/1987 | Carroll | 280/477 |
| 4,719,663 | 1/1988 | Termini | 403/353 X |

Primary Examiner—Charles A. Marmor
Attorney, Agent, or Firm—Eugene D. Farley

[57] ABSTRACT

A trailer hitch guide provides a temporary, removable V-shaped fence partly embracing a hitch ball for guiding a trailer tongue into place to fit over the ball. The guide is provided as an attachment made up in part of a flat plate having a central opening for accommodating the hitch ball, and this opening is elongated fore and aft to enable selective positioning of the plate relative to the ball so as to assure a proper location of the other part, which is a hitch fence mountable on the plate. Attachment of the fence to the plate is effected by downwardly and rearwardly directed studs on the fence that removably fit openings in the plate, the shape of the studs counteracting the forward thrust of the trailer tongue during hitching and also enabling easy mounting and dismounting of the fence to and from the plate, which remains on the towing vehicle hitch structure as by welding or attaching bolts.

1 Claim, 1 Drawing Sheet

U.S. Patent  Jun. 20, 1989  4,840,392
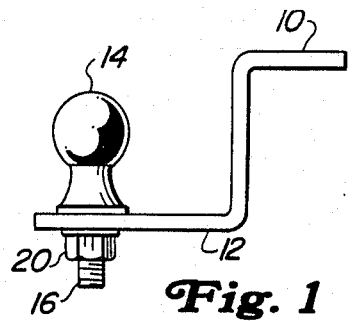
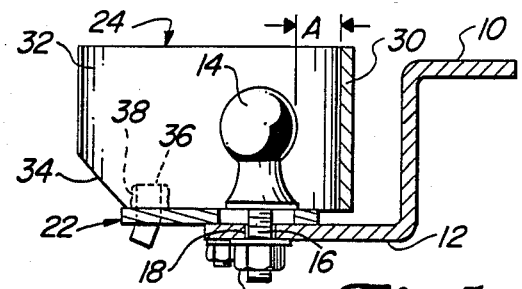
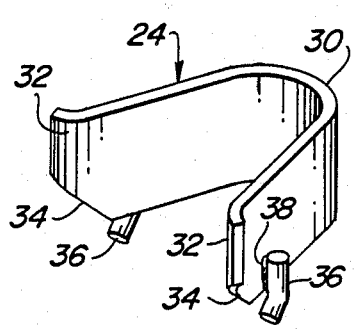
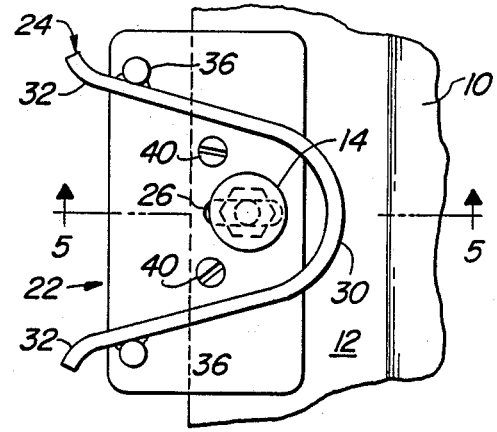
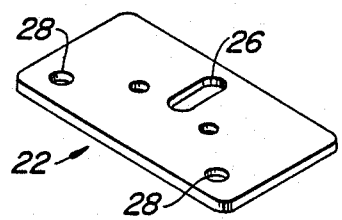
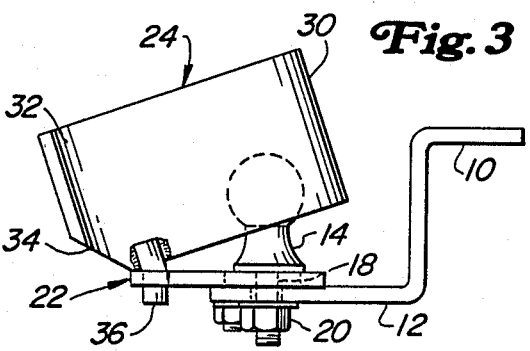
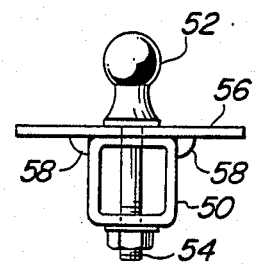
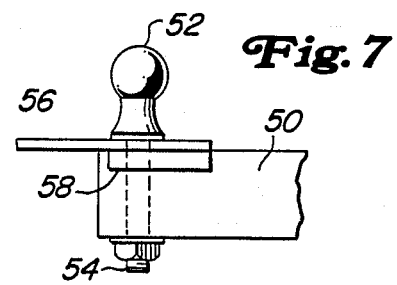

TRAILER HITCH GUIDE

BACKGROUND OF THE INVENTION

Hitch guides of the general character disclosed herein have been provided heretofore in many shapes and forms, all having the function of aiding in the hitching of a trailer tongue socket to the ball on the towing vehicle. Many of these have such drawbacks as complicated design, expensive manufacture, difficult to operate and the like, besides which some are so designed as to remain in place on the towing vehicle and thus interfere with proper trailing of the trailer during travel.

According to the present invention, a simple, low-cost attachment is provided which includes a V-shaped guide fence for temporary mounting on the towing vehicle for facilitating hook-up and which can be easily removed after hook-up so as to allow a wider range of lateral swinging between the towing vehicle and trailer. A further adjunct of the attachment is a plate adapted for fixed attachment to the towing vehicle hitch structure so as to properly locate the fence with respect to clearance and the allowance of sufficient space for effecting hitching so that the trailer tongue is guided directly to the ball without excessive forward overrun relative to the ball.

It is a feature of the invention that the plate has provision for fore-and-aft adjustment relative to the ball for the purpose of locating the fence. A further feature resides in the provision on the fence of bent studs which facilitate mounting and dismounting of the fence from the plate but provide also to counteract the forward thrust of the tongue during hitching so as to prevent forward displacement of the fence.

Further features and advantages of the invention will become apparent from the ensuing description and accompanying drawings.

DESCRIPTION OF THE DRAWINGS

FIG. 1 is a side elevation of a typical vehicle hitch structure including a hitch ball.

FIG. 2 is an "exploded" perspective of the basic parts of the hitch attachment according to the invention.

FIG. 3 is an elevation of the hitch structure with the attachment shown in a stage of mounting on the attachment plate.

FIG. 4 is a plan of the attachment in place.

FIG. 5 is a section along the line 5—5 of FIG. 4.

FIG. 6 is a rear view showing how the attachment may be used with a different type of towing vehicle hitch.

FIG. 7 is an elevation of the structure shown in FIG. 6.

DETAILED DESCRIPTION OF A PREFERRED EMBODIMENT OF THE INVENTION

The rear portion of the hitch structure of a typical towing vehicle arrangement is shown as comprising a Z-bar (10) or its equivalent having a rearwardly extending bottom ledge (12) which rigidly carries a typical hitch ball (14), the ball conventionally having a depending shank (16) passing through a bore (18) in the ledge (12) (FIG. 5) and receiving a securing nut (20).

FIG. 2 shows the two basic parts of the attachment as comprising a flat, horizontal steel plate (22) and a steel fence or guide (24) formed as a V as seen from above. The plate has a fore-and-aft elongated central opening (26) and in addition has a pair of transversely alined and spaced apart openings (28). The fence has a forward arcuate bight (30) and a pair of wings (32) that diverge rearwardly from the bight. The fence is preferably formed of one piece, shaped as shown. Each wing has a rear, lower cut-off corner (34) for purposes to appear later herein. Further, each wing has a stud or peg (36) that extends downwardly and rearwardly. The two studs are spaced apart on the order of the holes (28) in the plate (22) and are of circular section dimensioned to easily fit the respective holes. The studs are affixed to the respective wings as by welding at (38). As will appear subsequently herein, the plate (22) is shown as being rigidly attached to the ledge of the Z-bar by flat-head screws (40), but the plate could as well be welded (not shown) to the ledge, since it will remain with the hitch structure even though the fence is removed after it serves its guide function during hook-up. When the screws are used, both the plate and ledge must be drilled.

In using the attachment, the ball is first removed from the Z-bar ledge and the plate 22 placed on the ledge with its central opening (26) vertically alined with the ledge opening (18), and the ball is replaced, its shank passing through the openings (18) and (26) and the nut replaced but only hand-tightened for the moment. The fence is added to the plate by fitting the studs (36) through the plate holes (FIG. 3) and rocking the fence forwardly and downwardly to rest on the plate with the bight of the fence partly encircling the ball (FIG. 5). The corners (34) on the wings facilitate rocking the fence. At this stage, the fence and plate may be adjusted fore and aft together, relative to the ball, because of the elongated opening (26) in the plate, until a predetermined distance "A" (FIG. 5) is obtained between the bight of the fence and the front of the ball, which distance will also appear as respects the remainder of the bight as respects the partly encircled ball. This distance is based on the configuration of the typical socketed front end of a trailer tongue (not shown), usually in the form of a lip bordering at least the front of the socket. After the distance has been secured, the ball nut is securely tightened and rigid, affixation of the plate to the Z-bar ledge follows, either by the use of screws as at (40) or via welding (not shown), the plate being held in position by the tightened ball or any other suitable means (not shown).

At this point, the two-part attachment becomes a part of the towing vehicle hitch for the purpose of effecting the hook-up of the trailer tongue. As noted, the bent studs (36) not only facilitate rocking of the fence in place but also counteract the forward thrust of the trailer tongue should it temporarily overrun the ball in a forward direction; that is to say, the force of the tongue cannot unseat the fence. After the hook-up is achieved, the fence may be easily rocked to the rear and upwardly, readily clearing the forward part of the hitched trailer tongue. Removal of the fence enables an increased range of lateral swinging between the towing vehicle and trailer.

The features and advantages outlined above are available in the modified arrangement shown in FIGS. 6 and 7, where a further type of known hitch structure includes a tube (50) of square section and mounting a ball (52) very much like the ball (14) but having a longer threaded shank (54). In this form of the invention a plate (56) like the plate (22) is mounted, as by welding (not shown), on the hitch tube. The plate has spaced apart projections (58) that engage opposite sides of the tube for adding to the lateral stability of the plate. The plate is otherwise constructed like the plate (22) as to openings, etc., and function and is thus adapted to receive the fence (24) as will be obvious without elaboration.

Features and advantages of the invention other than as pointed out herein will readily occur to those versed in the art, as will many modifications in the preferred structure disclosed, all without departure from the spirit and scope of the invention.

I claim:

1. A trailer hitch guide for guiding a hitch socket component on a trailer tongue into registry with a cooperating hitch ball component on a towing vehicle, the guide comprising:

(a) a flat mounting plate member arranged for attachment to a towing vehicle with a hitch ball projecting upwardly therefrom, (b) a v-shaped guide fence member mounted removably on the mounting plate member and forming a vertically extending wall, the apex of the wall being configured to be positioned forwardly, with reference to the towing vehicle, of a hitch ball on the mounting plate member and the diverging wings of the wall being configured to diverge rearwardly, with reference to the towing vehicle, of the hitch ball on the mounting plate member for sliding contact by the socketed front end of a trailer tongue for guiding a hitch socket into registry with the hitch ball, and (c) securing means interengaging the mounting plate member and guide fence member for releasably securing said members together, whereby the guide fence member is removable from the mounting plate member after the ball and socket components of the trailer hitch are hitched together, (d) the securing means comprising a pair of studs secured to and projecting downwardly from the bottom edge of the fence member adjacent the diverging ends thereof, and stud-receiving openings in the mounting plate for removably receiving said studs, (e) the portion of the studs projecting downwardly from the fence member extending angularly in the rearward direction, with reference to the towing vehicle, of said diverging ends, and (f) the bottom corners of said ends of the diverging wings adjacent the studs being removed to form edges that extend angularly upwardly and rearwardly from the studs, whereby to facilitate removal of the guide fence member from the mounting plate member by rocking the fence member upwardly from the mounting plate member at the apex of the fence member.

* * * * *